Jan. 20, 1942.   F. G. COOK   2,270,818
WRAPPING MACHINE
Filed Jan. 22, 1940   13 Sheets-Sheet 6

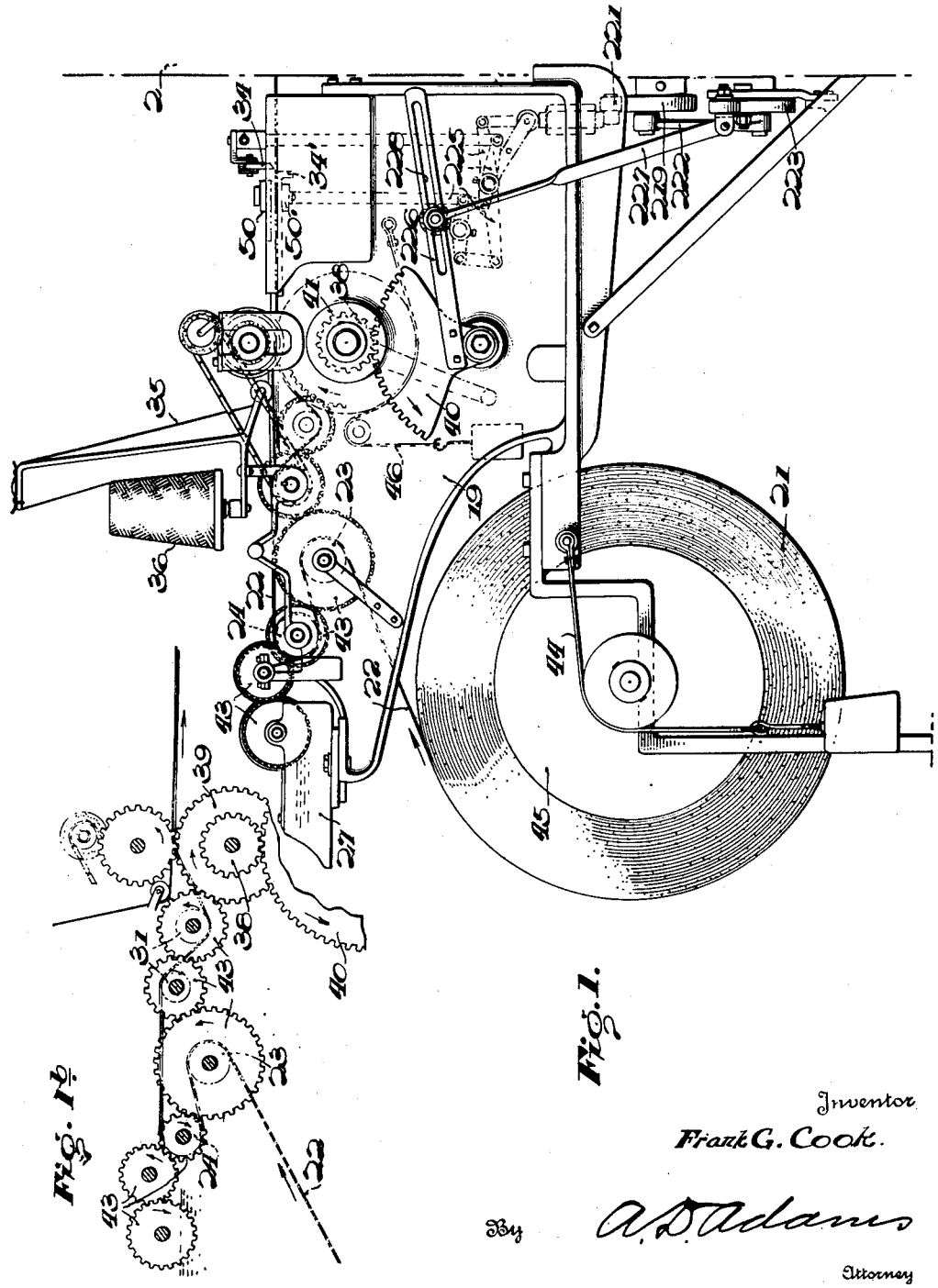

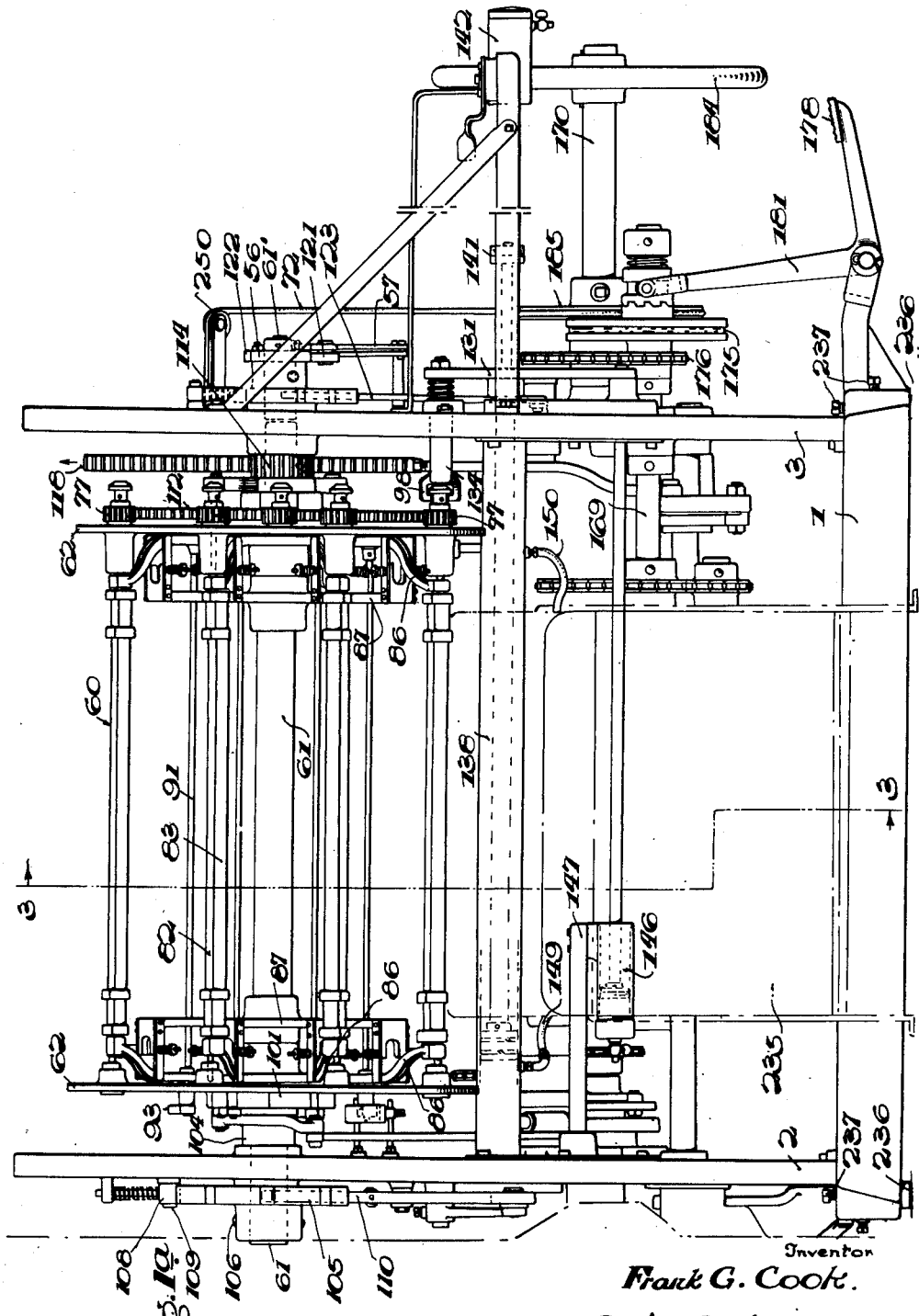

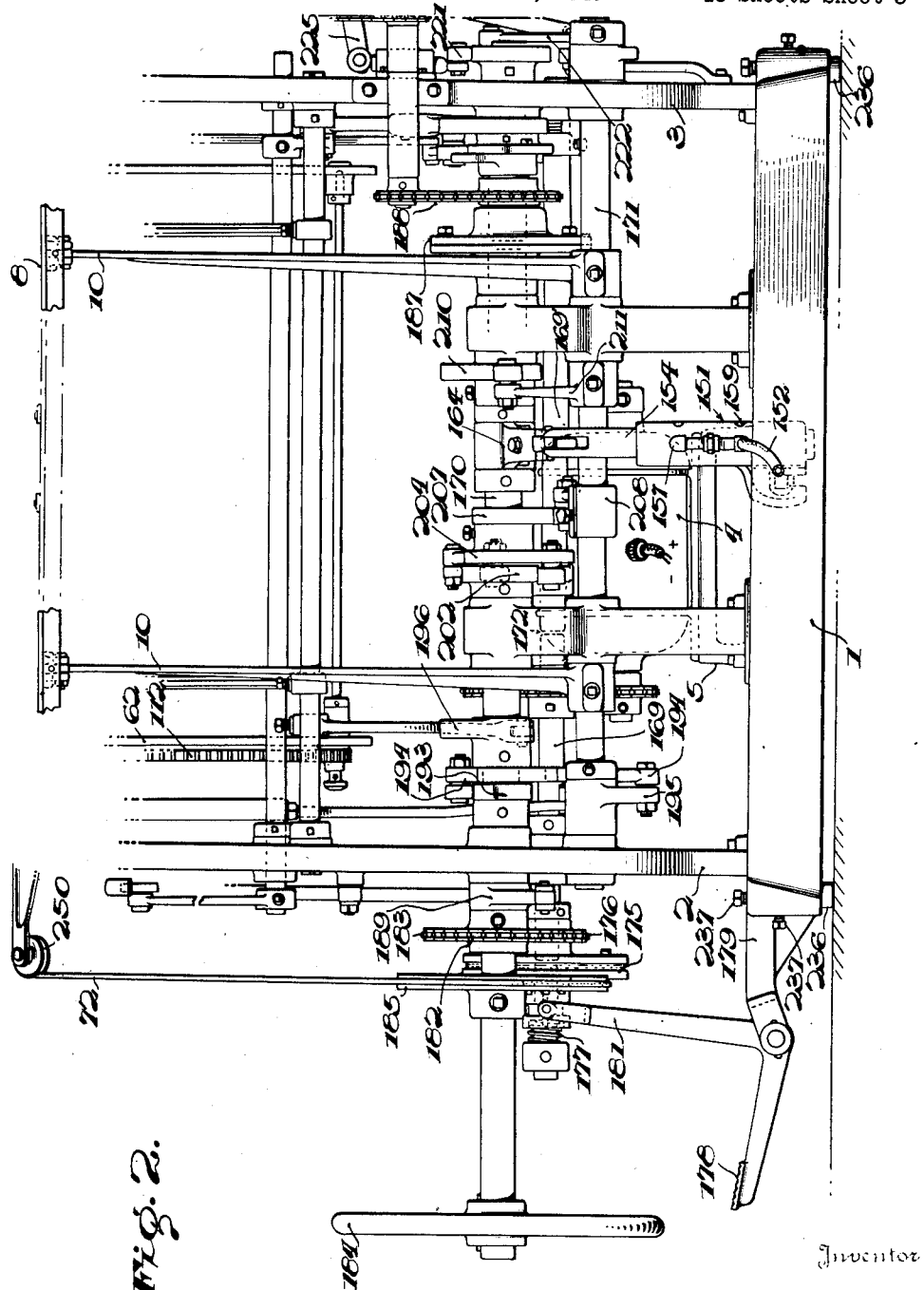

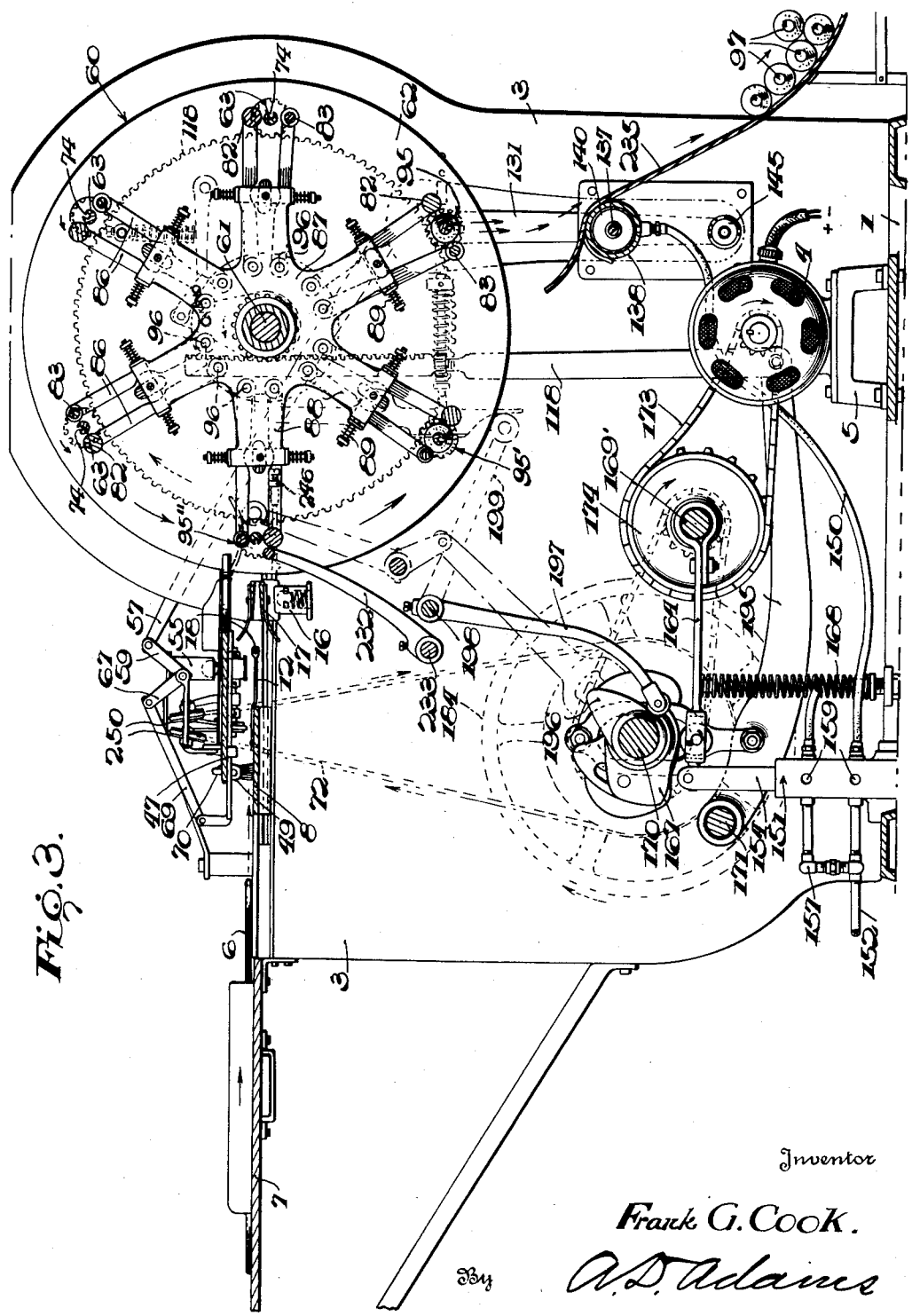

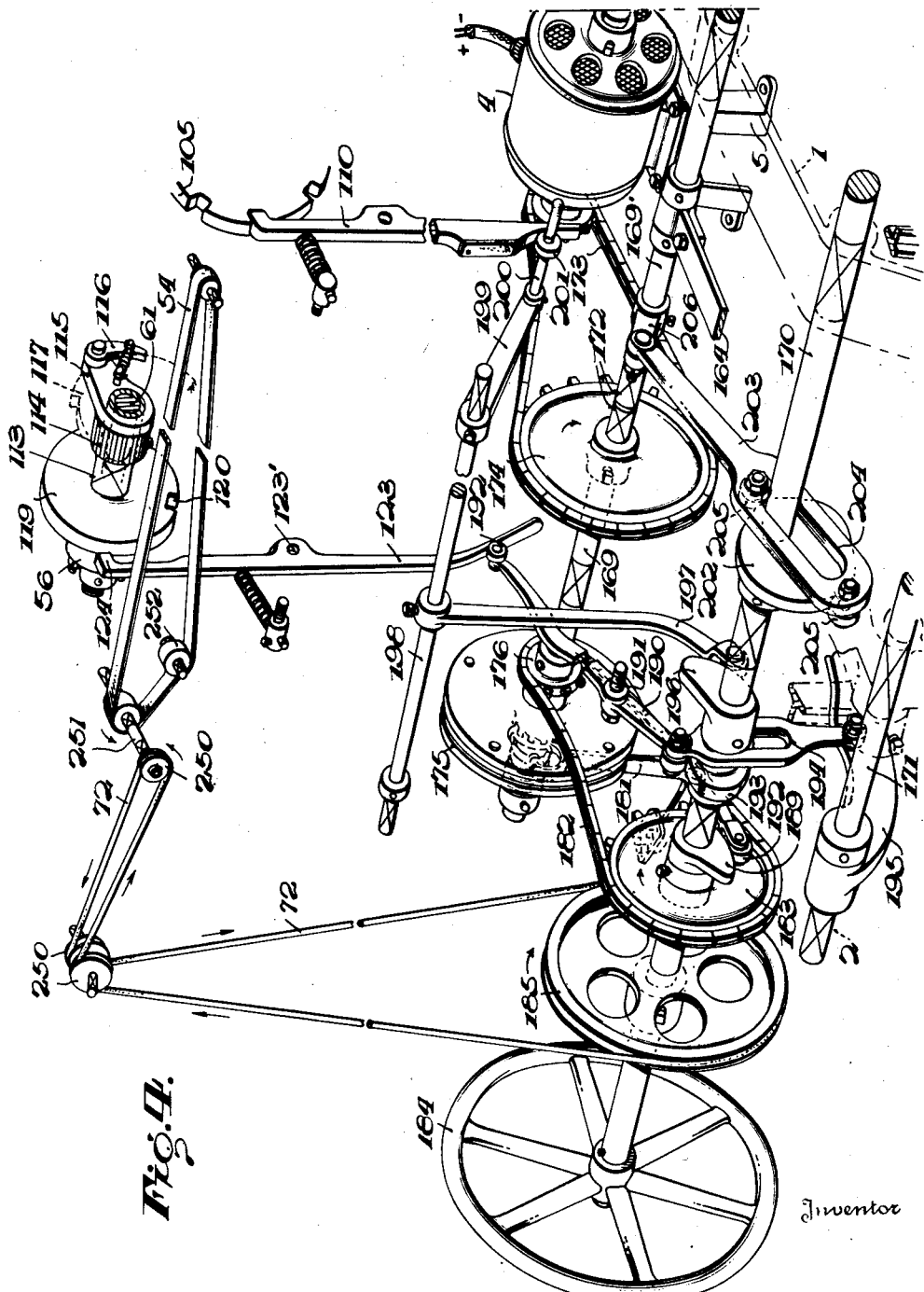

Inventor
Frank G. Cook.
A. D. Adams
Attorney

Jan. 20, 1942.  F. G. COOK  2,270,818
WRAPPING MACHINE
Filed Jan. 22, 1940  13 Sheets-Sheet 7
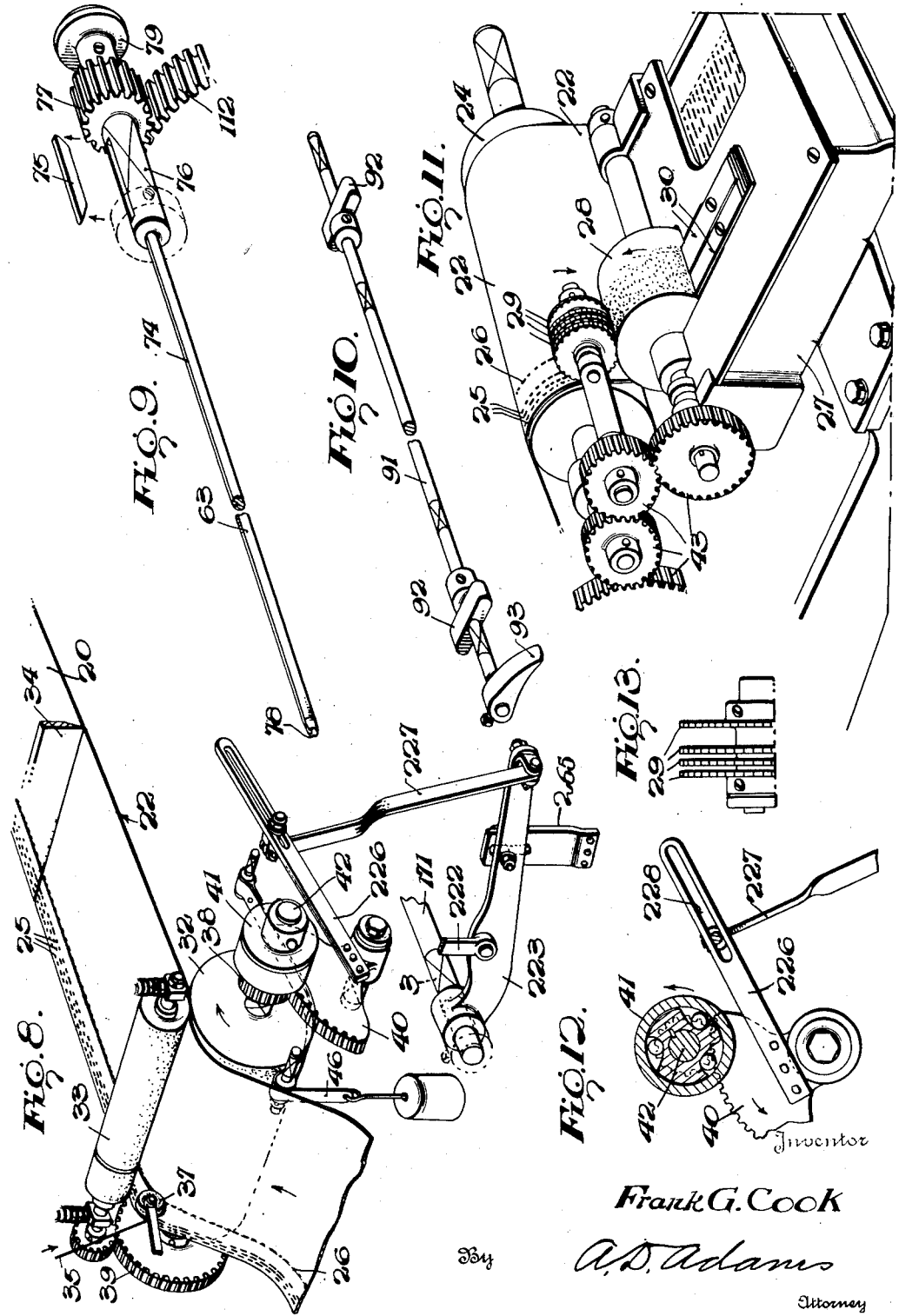
Inventor
Frank G. Cook
By
A. D. Adams
Attorney

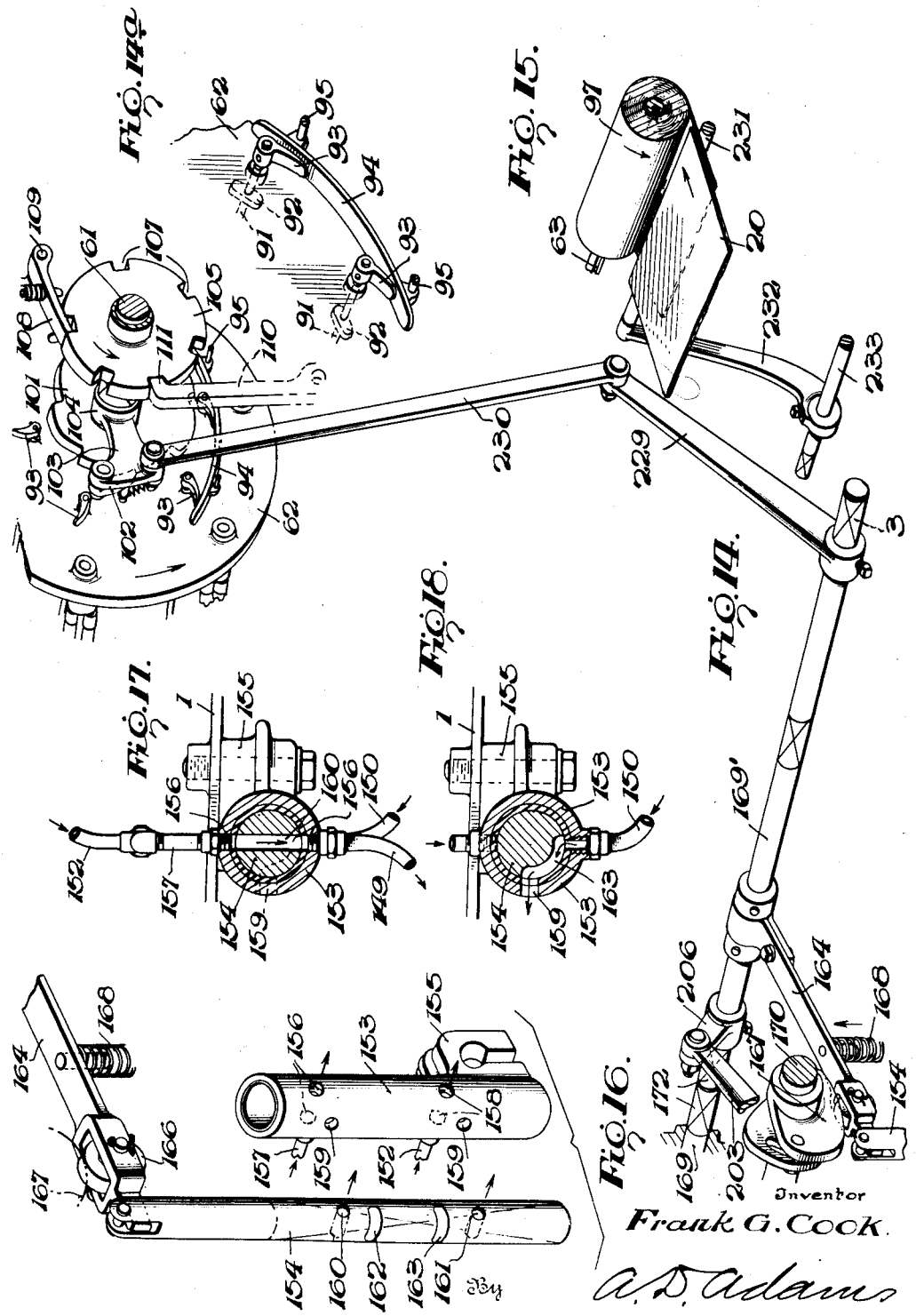

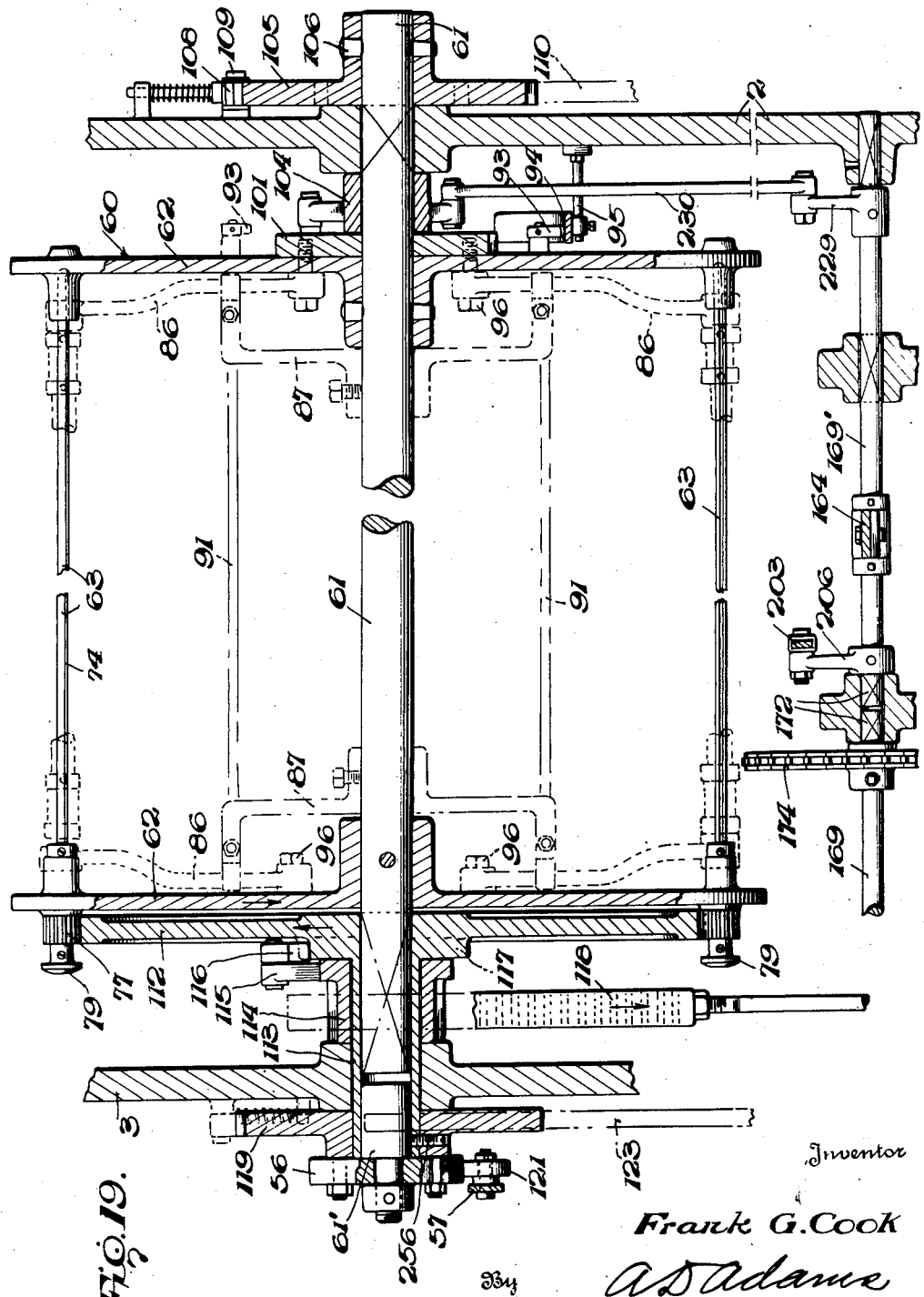

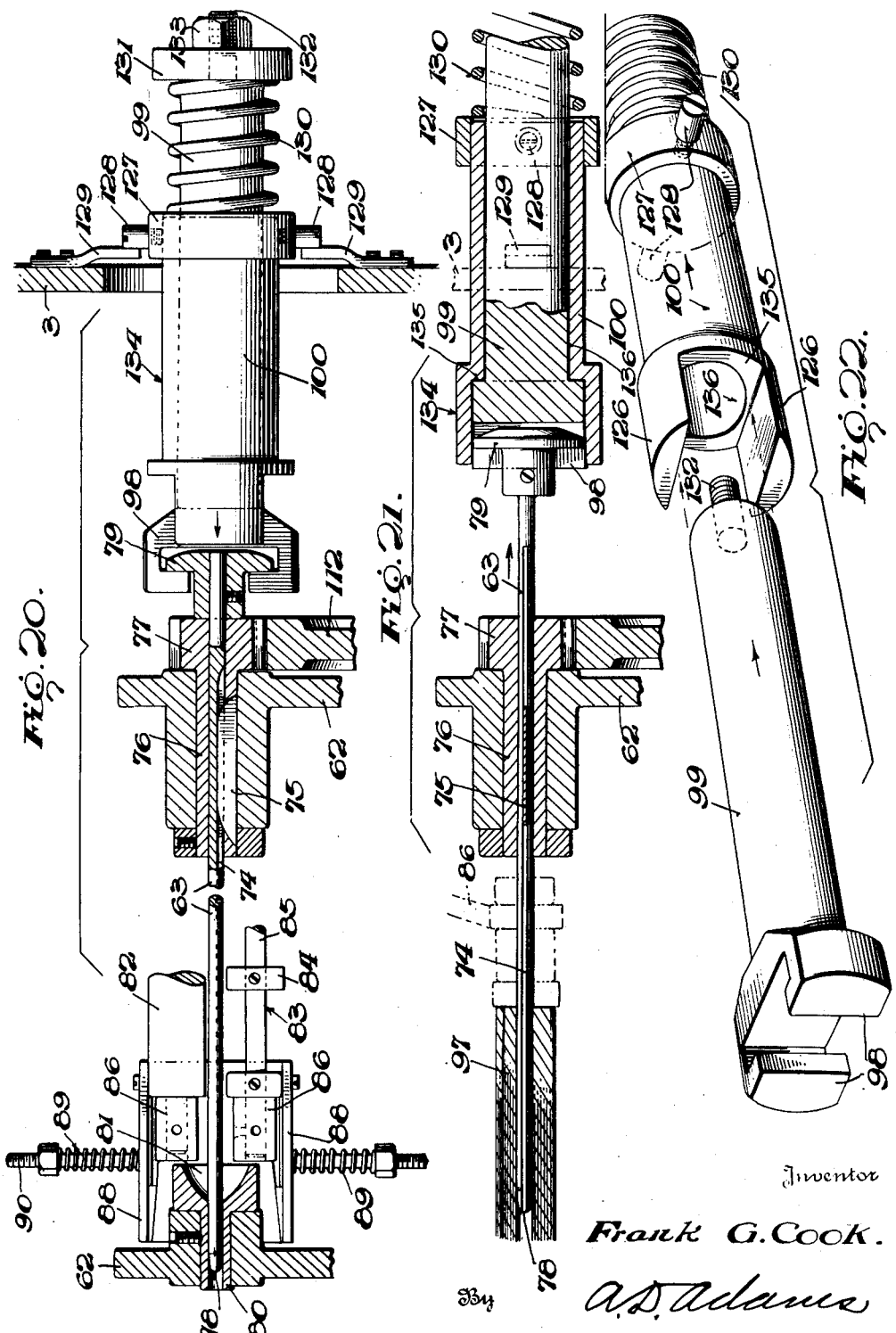

Jan. 20, 1942.  F. G. COOK  2,270,818
WRAPPING MACHINE
Filed Jan. 22, 1940  13 Sheets-Sheet 11

Inventor
Frank G. Cook.
By A. D. Adams
Attorney

Jan. 20, 1942.  F. G. COOK  2,270,818
WRAPPING MACHINE
Filed Jan. 22, 1940  13 Sheets-Sheet 12
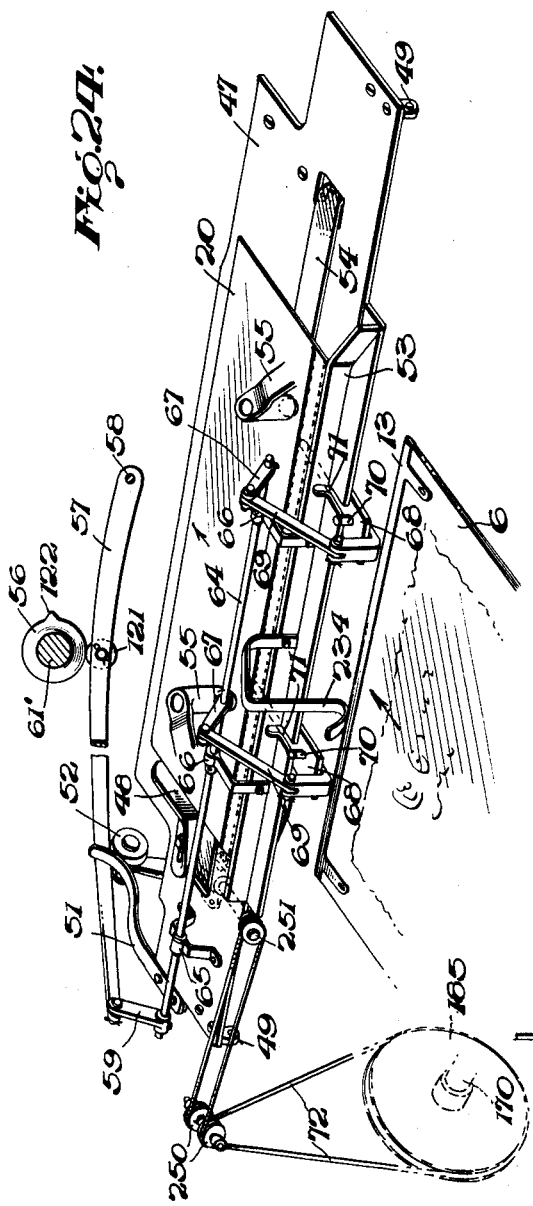
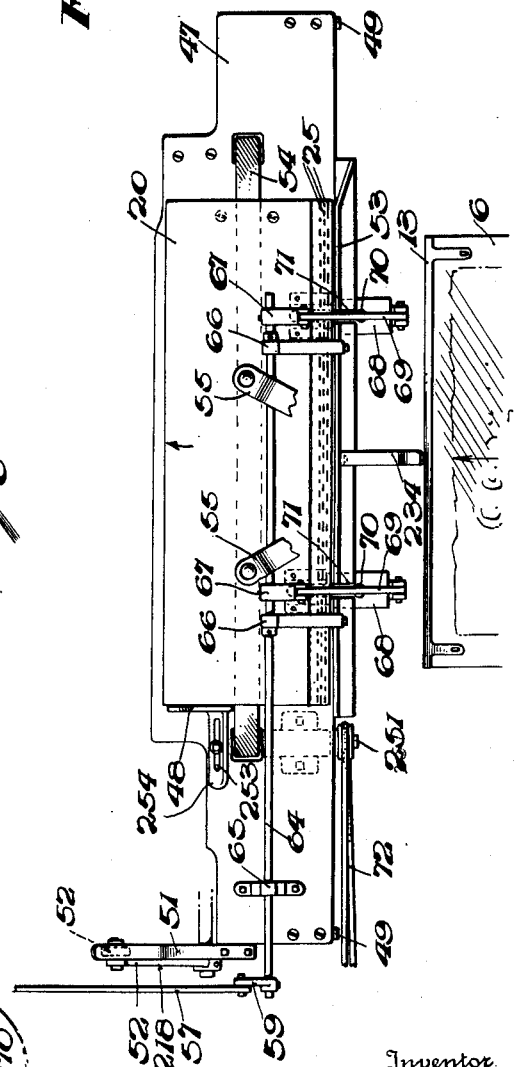
Inventor
Frank G. Cook.
By A. D. Adams
Attorney

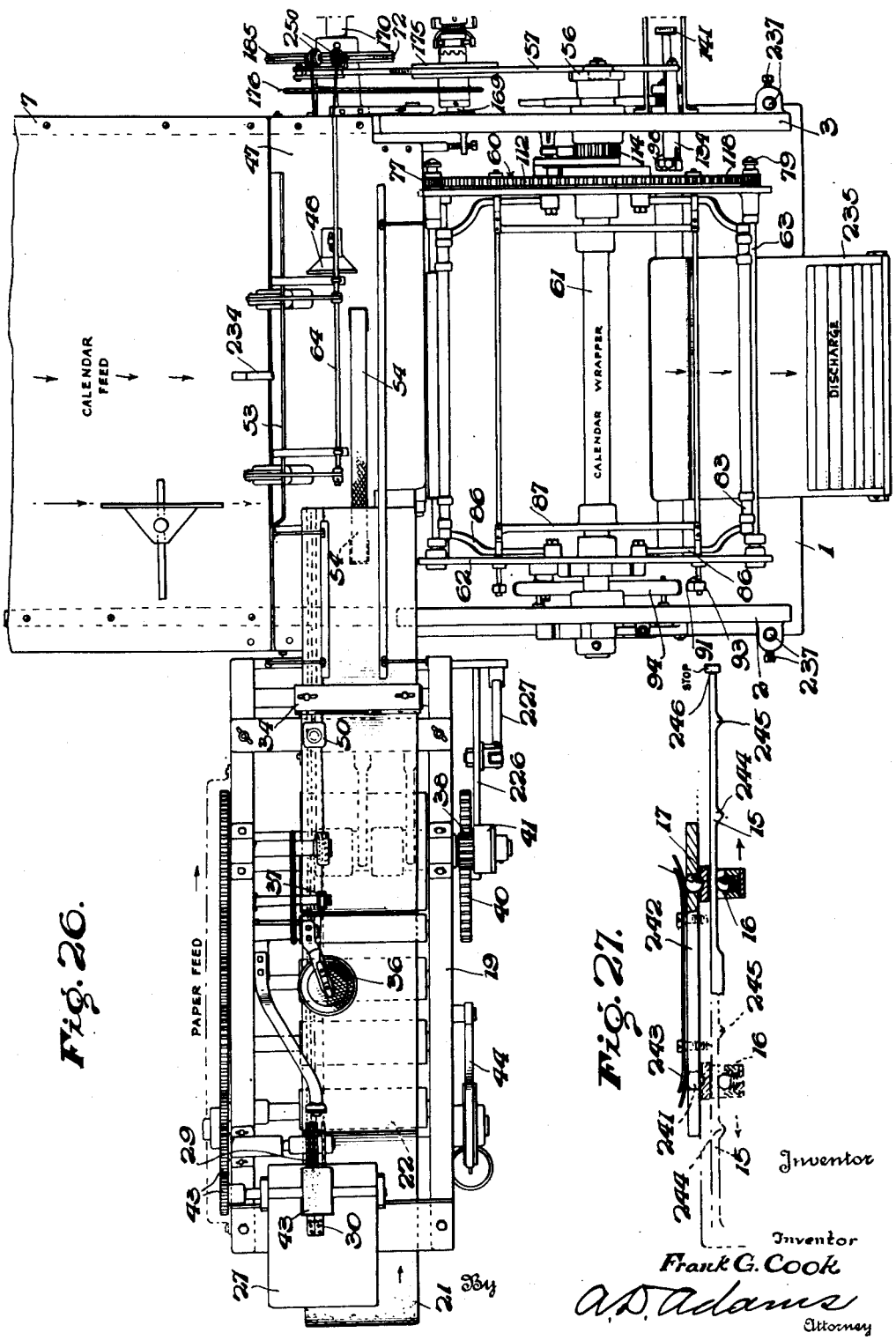

Patented Jan. 20, 1942

2,270,818

UNITED STATES PATENT OFFICE 2,270,818

WRAPPING MACHINE

Frank G. Cook, Atlanta, Ga., assignor to Alexander Dittler, De Kalb County, Ga.

Application January 22, 1940, Serial No. 315,082

28 Claims. (Cl. 270—27)

This invention relates to a wrapping machine and, more particularly, to a machine for successively winding calendars and the like, having the usual metal bound upper edge or the like, into a compact roll and during such winding or rolling to apply a wrapper to a convolution thereof and to the exterior of the roll. The main object of the invention is to provide an automatic machine having improved means for feeding, rolling, wrapping and ejecting or releasing such wrapped calendars and the like. Further objects of the invention reside in preparing sections of wrapping paper and with adhesive, partially rolling the calendars, feeding a wrapper into the partial roll, completing the rolling, and pulling the rolling means out of the roll in the proper timed relationship.

Other objects and advantages of the invention will appear in the following specification, when considered in connection with the accompanying drawings, in which:

Fig. 1 is a rear side elevation of the wrapping paper preparing part of the machine;

Fig. 1a is a rear side elevation of the center and right parts of the machine;

Fig. 1b is a side elevation, partly in section, of the train of gears for applying the adhesive and the thread and feeding the wrapping paper;

Fig. 2 is a front side elevation of the cam drive mechanism and associated parts in the lower part of the machine;

Fig. 3 is a vertical sectional view of the machine taken on line 3—3 of Fig. 1a;

Fig. 4 is a perspective view showing the main and cam drive mechanism and associated parts;

Fig. 5 is a perspective view showing the feed table and its cam drive;

Fig. 6 is a perspective view of the spring and ball holding means for the floating guide;

Fig. 7 is a detailed perspective view of one end of the floating guide;

Fig. 8 is a perspective view of the wrapping paper feed;

Fig. 9 is a perspective view of one of the winding rods;

Fig. 10 is a perspective view of the roll releasing cam shaft;

Fig. 11 is a perspective view of the glue applying means for the wrapping paper;

Fig. 12 is a cross sectional view of the clutch for the paper feed drive;

Fig. 13 is a fragmentary edge view of the glue applying wheels;

Fig. 14 is a perspective view of the controls for the calendar winding reel and the fluid valve;

Fig. 14a is a perspective view of the means for operating the cam shaft of Fig. 10;

Fig. 15 is a perspective view of a portion of a partly rolled calendar and its wrapping paper section;

Fig. 16 is an exploded perspective view of the control valve for the hydraulic winding rod extractor system;

Figs. 17 and 18 are cross sectional views of the valve of Fig. 16 in supply and exhaust positions respectively;

Fig. 19 is an axial sectional view of the winding reel and associated parts;

Fig. 20 is a part sectional and part side elevation of a winding rod and its extractor means on enlarged scale;

Fig. 21 is a longitudinal sectional view similar to Fig. 20 on enlarged scale, showing the extractor pulling out a winding rod;

Fig. 22 is an exploded perspective view of the extractor on enlarged scale;

Fig. 24 is a perspective view of the feed table for the wrapping paper;

Fig. 25 is a plan view of the feed table of Fig. 24;

Fig. 26 is a plan view of the entire machine; and

Fig. 27 is an elevational view, partly in section, showing the floating guide and feed table guide bars for the calendars.

Figure 23:
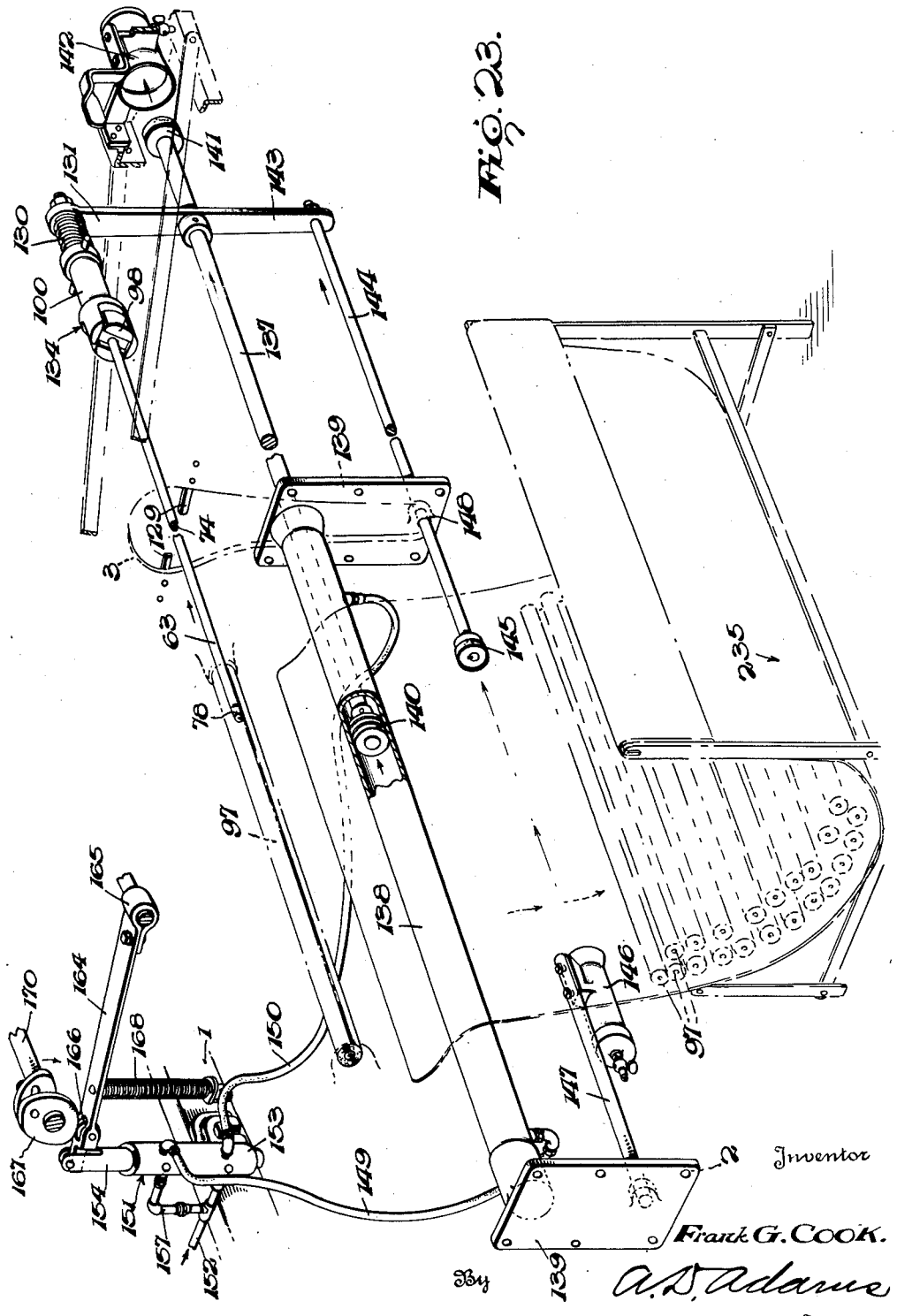
Fig. 23 is a perspective view of the pneumatically or hydraulically operated extractor system.

Throughout the drawings, the light crossed lines of the various shafts indicate bearings therefor.

The entire machine is mounted on a main base or platform 1, preferably in the form of a unitary casting, having two vertical side frame members 2 and 3 secured thereto. The machine may be driven by any suitable source of power, such as an electric motor 4 mounted on the platform 1 by the intermediary of a small base or table 5, Fig. 3, suitably secured on the platform 1. All the various mechanisms and operating parts of the machine are driven by the motor 4 and also all the various parts of the machine, both those that are driven as well as those that are stationary, are directly mounted on the platform 1 or are mounted in the side frame members 2 and 3, except for a number of minor supporting elements or braces.

*Calendar feed device*

The calendars 6 to be successively rolled and wrapped are placed on the fixed table 7, Fig. 3, which latter is secured to the side frame members 2 and 3. The calendar is then moved on the floating feed table 8, Figs. 2, 3 and 5, which is slidably mounted in the frame members 2 and 3 by means of guide flanges 9 on the ends of the feed table. The feed or floating table 8 is reciprocable on the frame members in a horizontal plane by means of a pair of links 10, each connected to a short link 11 to the outer side end of the table, Fig. 5. The other or inner side end of the table has a plurality of pusher fingers 12, preferably two, secured on the feed table 8, which are adapted to contact or positively grip the metal binding 13 of the calendar, between one side of the binding and the lowermost of the paper sheets of the calendar, to push or force the calendar into the rolling or winding mechanism, to be described hereinafter. For this purpose, each pusher finger 12 has a forked end 14 which grips the binding 13 as described. The feed table 8 also has a guide bar 15 at each end, each bar 15 having a spring pressed ball and socket member 16, Figs. 3, 7 and 27, to which is secured a pair of slightly wedge-shaped floating guide bars 17 with guide fingers 18 for the calendars.

The guide fingers 18 guide the calendars to be rolled between the guide bars 17 which latter are slidably mounted on the bars 15 so that both the table 8 and bars 17 have a floating action in a horizontal plane during feeding of a calendar and retraction of the table and bars after a feeding step.

Wrapping paper feed device

The mechanism for preparing and feeding the sections of wrapping paper 20 is illustrated particularly in Figs. 1, 1b, 8, 11, 24 and 25. The wrapping paper preparing device, including the adhesive and string applying devices, are mounted on and between two side frames 19 mounted on and secured at right angles in spaced relation to each other to the frame member 2. The wrapping paper sections 20, Figs. 24 and 25, are cut from the roll 21, from the latter of which the paper unrolls as a web 22, Figs. 1 and 1b, and passes over the rollers 23 and 24. As the web passes over the roller 24 it receives a number of sections 25 of adhesive adjacent one edge of the paper web and a single line of adhesive 26 spaced a slight distance from the sections 25, Figs. 8 and 11. The adhesive is supplied from a suitable source, such as the container 27, from which the adhesive is drawn up on the feed roller 28, Fig. 11, and transferred to the applicator rolls 29, the excess adhesive drawn up by the roller 28 being scraped off by blades 30 back into the container 27.

The web 22 of paper with the longitudinal sections 25 and 26 of adhesive proceeds over further feed rollers 31, Figs. 1 and 1b, to the main feed roller 32 having a cooperating felt roller 33 thereabove which is spring pressed and between which rollers 32 and 33 the web passes to the knife 34 which latter cuts the web against the support means 50 into the proper length so that the paper sections 20, Figs. 24 and 25, can then be fed by the endless belt 54 to a position to be fed into the partially rolled calendars. Just before the web reaches the rollers 32 and 33 a tearing string 35 is fed on to the adhesive line 26 from a spool 36, Fig. 1, by means of the roller 37.

The main roller 32 has a small gear wheel 38 mounted to rotate freely on the shaft 42 on one end and a larger gear wheel 39 securely mounted on the shaft 42 on the other end, Fig. 8, and this roller 32 is intermittently driven by the gear sector 40 meshing with the gear 38. Since the roller 32 must only rotate in one direction, and intermittently to feed the paper web, as will be explained, a one way clutch 41, Fig. 12, is mounted on the end of the shaft 42 adjacent the gear 38 so that in one direction of rotation of the sector 40, the clutch will rotate the shaft 42 to drive the roller 32, whereas in the other direction, the clutch will be disengaged.

The gear wheel 39 meshes with and rotates a train of gears 43, Figs. 1b and 11, to operate the adhesive applying means and to unroll the web 22 from the roll 21.

Since the machine operates intermittently, as will be described hereinafter, suitable means should be provided to act as braking means to maintain the paper web 22 taut so that the revolving parts of the paper feed may be intermittently stopped without creating a slack in the web at any point of its travel. For this purpose, a friction brake 44, Fig. 1, may be provided on the shaft of the feed roller 45 for the paper roll 21, also another friction brake 46, Figs. 1 and 8, is associated with the main roller 32.

If desired, a printing device 50 and 50' may be used to print any desired identification or address on the wrapping paper, said printing device printing on the underside of the wrapping paper on the other side of the adhesive sections 25 so that when the calendar roll is completed the printing will appear on the outside of the wrapped roll.

Referring now to Figs. 24 and 25, the wrapping paper sections 20, each cut to the desired and proper length to completely wrap the calendars 6, travel over and to a feeding plate or table 47 by means of the endless belt 54, Figs. 24 and 25 showing a wrapping paper section 20 in position against an adjustable stop 48 on the plate 47 and ready to be moved into a partially rolled calendar, Fig. 15, as will be explained hereinafter. The plate 47 is hinged by means of depending lugs 49 to the frame members 2 and 3 and the horizontal position and tilting of the plate to feed the wrapping paper is automatically controlled by the arm 51 secured at one end to the plate and controlled by the roller 52 on the arm 218 as will be explained hereinafter.

The plate 47 is also provided with a side guide rail 53, Figs. 24 and 25, integral therewith against which the adhesive side edge of the wrapping paper 20 slides while the latter is fed into position against the stop 48 by means of the feed belt 54 and with the aid of the arms 55. The arms 55 hold the wrapping paper sections 20 on the belt 54 so that the sections of paper will be brought to the precise position to be fed into the partially rolled calendar, Fig. 15, as will be explained hereinafter.

As the roller 52 is lowered, thereby permitting the table to tilt clockwise, Fig. 24, to feed a sheet of wrapping paper 20, a cam 56 will rotate a lever 57 around its pivot 58, the latter being mounted to the frame member 3. A short link 59 connects the free end of lever 57 to a rod 64 which latter is rotatably mounted on the plate 47 at 65 and to the side guide rail 53 at 66. A pair of short arms 67 are mounted in spaced relation on the rod 64 to rotate therewith and each arm is connected to a pusher bar 68 by means of a link 69. Each pusher bar 68 is provided with an upstanding pin 70 which, when the rod 64 is rotated, the bars 68 will be moved toward the wrapping paper so that the two pins 70, passing through slots 71 in the plate 47 and rail 53 will contact the edge of the wrapping paper 20 adjacent the adhesive section and positively move it off the plate in a direction at right angles to the direction of its feed movement onto the plate, to ultimately feed it into a partially rolled calendar, Fig. 15.

Figs. 24 and 25 also show the drive, such as the cord or cable 72, to drive the belt 54 by means of the belt pulley 185 and small pulleys 250 and the drive shaft 251. The belt 54 is maintained taut by means of an idler roller 252, Fig. 4, which is under tension by any suitable means.

The stop 48, Figs. 24 and 25, is adjustably mounted on the plate 47 by means of the slot 253 and bolt 254 to properly adjust the paper section 20 to properly feed it into the partially rolled calendar or to adjust the position of the wrapping paper sections if a wider or narrower calendar is to be wrapped.

Winding reel

The winding reel 60, in which the calendars are rolled and wrapped and the wrapper pressed to the adhesive, is illustrated in Figs. 1a, 3 and 19. The reel 60 is mounted to rotate with the shaft 61, Fig. 19, the latter rotating in suitable bearings in the frame members 2 and 3 and is composed of two spaced frame discs 62, mounted to rotate with the shaft 61, and a plurality of rolling rods 63 of which in the example illustrated, six are included, although any suitable number may be employed.

Each rolling or winding rod 63 is provided with a longitudinal slot or groove 74 to receive the metal binding 13 of the calendar 6 to be rolled thereon, Fig. 21, as well as a key member 75 in the extended bearing sleeve 76 of the gear 77, Figs. 9, 20 and 21. One end of each rod 63 has a slightly levelled or cone-shaped end 78 and a button or head member 79 rigidly secured on the other end. When the rod 63 is in its retracted position, Fig. 20, it projects into and rotates in the receiving sleeve 80 mounted in one of the discs 62. Each sleeve 80 has a funnel-shaped cut out portion 81 integral therewith to guide its rod 63 therein upon its retraction, as will be more fully explained hereinafter.

Also, each rolling rod 63 is provided with a pressure rod 82 and a counterpressure rod 83, the latter of which consists of a plurality of spaced collars 84 securely mounted on a shaft 85, Fig. 20. Each rod 82 and 83 is mounted on a lever 86 pivoted at its inner end 96 to one of the discs 62, the rods 82, 83 being mounted in said levers, either in a fixed or rotary relationship, preferably the latter. As seen in Fig. 3, there are two levers 86 pivoted in pairs in spaced relation radially around each disc 62 and the six double pairs of levers 86, one double pair for each rolling rod 63, are maintained in the radial positions by means of a spider frame 87 securely mounted on the shaft 61, Fig. 19, to rotate therewith and with the discs 62. Each side lug 88, Fig. 20, of the spider frame 87 has two opposing springs 89 each adjustable as to tension on the bolt 90 in order to urge each pair of rods 82 and 83 toward each other, Fig. 3, on diametrically opposite longitudinal contact lines relative to its respective rolling rod 63. Also, each opposing pair of levers 86 is provided with a cam rod 91, Figs. 3, 10 and 19, provided with a cam member 92, one for each pair of levers 86, and an actuating finger or cam 93, Fig. 10, on one end of the rod 91. This finger 93, upon rotation of the winding reel, is adjusted to strike a stationary abutment or curved plate 94, Figs. 14a and 19, mounted on the frame member 2 by means of a pair of rods 95 and which is in the circumferential path of the fingers so that upon striking such abutment, the particular rod 91 and its two cam members 92 will be rotated slightly so that the latter will spread the levers 86 and they in turn the rods 82 and 83, apart to release the rolled and wrapped calendar, as will be explained hereinafter. As shown in Fig. 3, other than in the calendar ejecting or releasing position at 95, when the fingers 93 are not in contact with the abutment 94, the cam members 92 will be parallel to the levers 86 but when the rods 82 and 83 are spread apart as shown at 95, the cam members 92 are at right angles relative to the rods 82 and 83. Thus the abutment 94 is mounted on the frame member 2 at such location in the circumferential path of the fingers 93 where it is desired to release the rolled and wrapped calendars.

The right hand disc 62, Figs. 19 and 14, has a ratchet wheel 101 suitably secured thereto by such means as the bolts 96 which latter also comprise the pivot points for the levers 86 mounted on the opposite side of the right hand disc 62. A spring-pressed pawl member 102, Fig. 14, for the ratchet wheel 101 is mounted on a rocker arm 103 which latter is freely rotatable on the shaft 61 of the winding reel by means of a bearing 104. This bearing 104 and the rocker arm 103 are mounted on the shaft 61 between the ratchet wheel 101 and the frame member 2. Fig. 19, and on the other side of the frame member 2 a locking disc 105 is securely mounted on the shaft 61 by suitable means such as the pin 106. This locking disc 105 has as many notches or cut out portions 107 in its periphery as there are rolling rods 63 in the winding reel, namely, six. Two levers cooperate with the notches 107 of which one spring pressed lever 108, pivotally mounted in the frame member 2 at 109, Fig. 19, acts to prevent rotation of the winding reel in clockwise direction and therefore only in the direction of the arrows, Fig. 14, whereas the other lever 110 acts to lock the winding reel each time it makes a stop to receive a calendar and wrapper to be rolled in one winding rod 63 and simultaneously to eject and release a rolled and wrapped calendar from another winding rod. The locking lever 110 is provided with a right-angle hook member 111, Fig. 14, which projects into the notches 107. The operation of these elements will be more fully described hereinafter.

On the outside of the left hand disc 62, Fig. 19, of the winding reel 60, a large gear wheel 112 is mounted to rotate freely on the shaft 61 and this gear meshes with the gears 77 mounted on the winding rods 63. The gear 112 has an extended bushing 113 forming a bearing for the actuating gear 114 mounted to rotate thereon, the latter being integral with or secured to a pawl lever 115, Fig. 5, having a spring-pressed pawl 116 pivotally mounted on the end thereof. The pawl 116 cooperates with a ratchet member 117, Fig. 19, integral with the gear 112 and a toothed rack bar 118 meshes with the gear 114 which rotates the lever 115 and pawl 116 in both directions upon the reciprocating motion of the rack bar 118 but the ratchet 116 rotates the gear 112 in only one direction. The bushing 113 has a bearing surface in the frame member 3, Fig. 19, and extends beyond said member 3 to the left on which a locking disc 119 is secured having a notch 120, Fig. 5, in the periphery thereof. The cam 56, Figs. 19 and 24, is secured to the disc 119 and cooperates with a roller 121 on the lever 57. This cam 56 actuates the feed table 47 for the wrapping paper sheets 20 and upon each successive rotation of the gear 112 the projecting portion 122, Fig. 24, of the cam 56 strikes the roller 121 to rotate the lever 57 around its pivot 58 to successively feed a sheet of wrapping paper, that is upon each rotation of the winding rods 63. A sheet of wrapping paper is fed into the partly wound calendar, Fig. 15, which is adjacent the feed plate 47.

A spring pressed locking lever 123, Figs. 4 and 5, is provided pivotally mounted at 123' in the frame member 3 and this locking lever is provided with a right angle hook 124 which is adapted to project into the notch 120 to lock the gear 112 against rotation in the operating cycle of the machine. It will be seen in Fig. 19 that the shaft 61 is split in the frame member so that the short shaft 61' in the bushing 113 rotates only with the parts 56, 119 and 113, due to a nut on the end of the stub shaft 61' and the set screw 256 in the disc 119 and the bushing 113.

Extractor mechanism

The extractor mechanism for extracting a rolling rod 63 out of a rolled and wrapped calendar 97 is illustrated in Figs. 20 to 23. When a rolled and wrapped calendar reaches the stage in the position of the winding reel shown at 95 in Fig. 3, where the calendar is to be released from the machine, the button or head member 79 in its circumferential travel around the axis of the shaft 61, by the rotation of the winding reel, moves into the jaws 98 of the extractor bar 99, the latter telescoping in the cylindrical actuator 100. The actuator 100 has a fork 126 at one end into which the head member 79 of the rolling rod is pulled so that, together with the jaws 98, the extractor device 134 will be able to make and maintain a positive grip on the head member during the extracting and retracting movements. A collar 127 is secured on the other end of the actuator and this collar is provided with a pair of pins 128 which are adapted to abut against the stop lugs 129 mounted on the frame member 3. A spring 130 abuts at one end against the actuator 100 and surrounds the bar 99 with the other end abutting against an actuating arm 131, which latter is mounted on a threaded pin 132 and is held thereon by the nut 133.

The extractor device 134 is shown in its two positions in Figs. 20 and 21, in which, in Fig. 20, the parts are shown in the position after the discharge of a rolled and wrapped calendar and retraction of the rolling rod 63 so that the latter may move on in its circumferential path to receive a new calendar and wrapping paper sheet. Fig. 21 shows the extraction of the rolling rod 63 which latter is pulled axially from the rolled and wrapped calendar roll 97 with the head member locked in the extractor device, the spring 130 having forced the bar 99 from the position of Fig. 20 to the position where the jaws 98 abut against the face 135 of the actuator 100 in the movement of the bar 99 toward the right in the bore 136 of the cylindrical actuator 100. The compression of the spring 130 and the movement of the bar 99 to the left, to the position of Fig. 20, is accomplished by the movement of the arm 131, which will be explained hereinafter, forcing the bar 99 to the left relative to the actuator 100, which latter ceases its movement to the left when the pins 128 strike against the lugs 129.

Pneumatic or hydraulic system for extractor mechanism

The hydraulic system for the extractor mechanism is particularly illustrated in Fig. 23 and details thereof are shown in Figs. 3 and 16 to 18. The extractor device 134, as already referred to, is mounted on the arm 131 which latter is secured on a piston rod 137. The piston rod 137 reciprocates in a cylinder 138 mounted on and supported between two plates 139. These plates 139 may be suitably secured one to each frame member 2 and 3. A piston 140 is secured on the end of the piston rod 137 which reciprocates in the cylinder 138 and the other end of the rod also has a piston 141 which, however, with its cylinder 142, acts as a buffer or cushioning device to stop the extracting movement of a rolling rod 63 at the end of its movement without jarring or setting up vibrations. The arm 131 has an extension 143 to which a rod 144 is secured having a piston 145 at the end thereof which cooperates with a cylinder 146. The rod 144 extends through and has a bearing support 148 therefor in the right hand plate 139 and the cylinder 146 is supported on a short rod 147 mounted on the other plate 139. This rod 144, piston 145 and cylinder 146 also acts as a buffing or cushioning device to prevent jarring when the winding rod and extractor device 134 reach the end of the retraction movement.

The cylinder 138 is fed with a compressed fluid, such as air, by means of preferably flexible hose connections 149 and 150, one for each end of the cylinder, to successively permit compressed air to enter the cylinder on one side and then the other side of the piston 140. The flow of compressed air to the cylinder 138 is controlled by a valve 151 which latter obtains its compressed air by means of the flexible hose 152 from any suitable source, not shown.

The valve 151 is composed of two parts, Figs. 16 to 18, a stationary sleeve 153 and a movable piston 154, the sleeve 153 being secured by means of a lug 155 to the base 1, Fig. 3. The sleeve 153 has two pairs of passages therein, an upper pair 156 for the pipe 157 connected to the air supply hose 152 on one side and the hose 149 to one end of the cylinder 138, and a lower pair 158 connected to the supply hose 152 and the hose 150 to the other end of the cylinder 138. The sleeve 153 also has two exhaust ports 159 therein. The movable piston 154 also has two passages 160 and 161 extending entirely through the piston and a pair of part-peripheral passages 162 and 163 which latter cooperate alternately with one and then the other exhaust port 159 to exhaust the air out of one and then the other side of the piston 140 in the cylinder 138. The passages 156 and 160 are in register alternately with the passages 158 and 161 to feed the compressed air alternately into one end and then the other end of the cylinder 138. The actual operation of the hydraulic system in timed relation will be more specifically referred to hereinafter.

The movable piston 154 is reciprocated in its cylinder 153 by means of a lever 164 pivoted at 165 at one end and secured in operative position with the outer end of the movable piston 154. Near the piston a roller 166 is mounted in the lever 164 and this roller cooperates with a cam 167, the latter actuating the lever 164 and the piston 154 downwardly. The roller 166 and therewith its lever are constantly urged upwardly against the cam 167 by means of the compression spring 168 which thus also moves the piston 154 upwardly controlled in such movement also by the configuration of the cam 167.

Drive mechanism

The drive mechanism for the machine comprises three main shafts mounted in bearings in the frame members 2 and 3, Figs. 3 to 5, namely the main drive shaft 169, the cam shaft 170 and the rocker arm shaft 171. The main drive shaft 169 is split in the bearings 172, Fig. 4, into auxiliary shaft 169' co-axial with the main drive shaft 169. The motor 4 drives the main shaft 169, Figs. 3 and 4, by means of a chain 173 and the sprocket wheel 174, the main shaft thus driving one part of the clutch 175 of which the other part thereof is connected to the small sprocket wheel 176 which is loosely mounted on the shaft 169. The clutch is normally in engagement by means of spring 177, Fig. 2, but when it may be desired to stop the cycle of operations of the machine without cutting off the electric current to the motor 4, the operator of the machine merely depresses the foot pedal 178, which is pivotally mounted to the base 1 by means of the extension 179 and is connected to the collar 180 of the clutch 175 by means of the arm 181, so that the two parts of the clutch will be separated to cut off the drive to the sprocket wheel 176.

The small sprocket wheel 176, Figs. 2 and 4, drives the cam shaft 170 by means of a chain 182 and the large sprocket wheel 183 securely mounted on the cam shaft 170. The complete cam shaft 170 is shown in Figs. 4 and 5 and comprises numerous cams securely mounted thereon and also a number of other driving elements, which will be referred to, as well as a hand wheel 184 which may act as a fly wheel but its main function is to permit a manual setting of the various parts of the machine particularly when starting the machine, with the foot pedal 178 depressed, to place the beginning of the cycle of operations in the proper starting order. The cam shaft 170 is also provided with a belt pulley 185 which by means of the cable 72, Fig. 4, drives the belt 54 to feed the wrapping paper sheets. Also, a small sprocket wheel 186 is mounted on the shaft 170 which is connected to the latter by means of an adjustable pair of discs 187 one of which is secured to the cam shaft 170. A driving chain 188, Fig. 2, may actuate a printing device, not shown, to print any desired identification or address on the wrapping paper.

The cams on the cam shaft 170 are the following, beginning from left to right in Figs. 4 and 5:

189 is the gear release cam for the large gear 112 and cooperates with the rocking lever 190 pivoted at 191 and having a roller 192 at both ends, of which one rolls on the cam 189 and the other rocks the locking lever 123 cooperating with the locking disc 119 for the gear 112.

193 is the drive cam for driving the large gear 112 and cooperates with the slotted reciprocating arm 194 guided on the cam shaft 170 and reciprocated by the drive cam, said arm 194 rocking the lever 195 connected to the toothed rack bar 118, the lever 195 being rotatably mounted on the rocker shaft 171.

196 is the reel release cam for releasing the winding reel as the calendars are rolled and cooperates with a rocker arm 197 which in turn rocks the intermediate shaft 198 and a rocker arm 199. The latter has a short rod 200 with a contact roller 201 thereon which latter contacts with and rocks the locking lever 110 to lock and unlock the winding reel 60 by means of the locking disc 105.

202 is the rocker cam to rotate the auxiliary shaft 169' back and forth by means of a reciprocating rod 203 having one end slotted forming a link 204 for the shaft 170 with a collar 205 at each end of the slot. The other end of the rod 203 is connected to the shaft 169' by means of a rocker arm 206. The shaft 169' moves the rocker arm 229, Figs. 19 and 14, up and down which by means of the link 230 actuates the rocker arm 103 to rotate the winding reel stepwise.

207 is the feed-in cam which actuates the rocker shaft 171 by means of the rocker arm 208 and roller 209 to rotate the shaft 171 clockwise, swing links 10 and move feed table 8 forward, to feed the calendars into the winding reel.

210 is the return cam which actuates the rocker shaft 171 by means of the rocker arm 211 and roller 212 to rotate the shaft 171 counterclockwise, swing links 10 and move feed table 8 backward, Fig. 5, to return the table 8 after each calendar feed.

213 is the wrapping paper feed table release cam which actuates to reciprocate a forked lever 214 guided by the roller 215 and connected to the rocker arm 216. The latter is connected to the shaft 217 which has a rocker arm 218 connected thereto with the roller 52 which cooperates with the arm 51 secured to the table 47, Fig. 24.

219 is the control cam for the feed and preparation of the wrapping paper sheets which actuates a reciprocating rod 220 by means of the roller 221 on its periphery and a link 222 connected to a rocker arm 223, the latter being loosely mounted on the rocker arm shaft 171, Fig. 5. The rod 220 reciprocates in a sleeve 224 secured to a fixed part of the machine frame and actuates a system of interconnected levers 225 to actuate the knife 34 and the supporting means 50, Fig. 1. The rocker arm 223 is adjustably connected to a bar 226 by means of a connecting link 227. The bar 226 is connected to the gear sector 40, which intermittently operates the wrapping paper feed, and is provided with a slot 228 in which the link 227 is adjustably secured. The rocker arm 223 may be supported in its rocking movement by a support 265, Fig. 8.

Miscellaneous details

Fig. 15 illustrates a supporting bar 231 mounted on a link 232 which latter is mounted on the shaft 233, to support the calendar and the wrapping paper before they form the convolutions of the roll.

Figs. 24 and 25 show a guide clip 234 secured on the side guide rail 53 of the feed plate 47, to aid in guiding the calendars 6 under the feed plate 97 and into the slot 74 of the winding rods 63.

The rolled and wrapped calendars 97 as they are released from the winding reel fall from the latter into a receiving receptacle 235, Figs. 1a, 3 and 23, located at the back or the side opposite the feed of the calendars, of the machine. Any suitable receptacle, or other means, may be used for this purpose, if desired.

The main base platform 1 of the machine may be placed directly on the floor, but it is preferable to provide a foot member 236, Figs. 1a and 2, at each corner thereof which may be adjustable in the platform by means of screws 237, so that the machine may be placed in a perfectly level position even if the floor thereunder may not be exactly level.

The floating guide bars 17, Figs. 3, 5 to 7 and 27, merge at the ends 238 and slide on the guide bars 15 by means of the U-shaped guide 239 secured thereto. The spring pressed ball and socket member 16 is secured to the guide 239, as shown in Fig. 7. The end 238 is also provided with a perforation 240 which is adapted to cooperate with one or the other ball 241, Fig. 6, in the stationary plate 242 having flat springs 243 on the top surface thereof to force the balls 241 downwardly. Each stationary plate 242 is suitably secured to its respective frame member 2 and 3 and is provided with an adjustable stop screw 243, Fig. 6, against which the guide bars 17 abut in their calendar feeding position by means of the ends 238. The underside of the guide bars 15 are provided with a pair of spaced depending lugs 244 and 245, Fig. 27, which cooperate with the ball of the member 16 to maintain the bars 17 in their proper positions during the various operating steps and to reciprocate the bars 17 during the successive calendar feeds. An adjustable stop 246, Figs. 3 and 27, is provided on the machine frame for each guide bar 15 which limits the forward movement of the floating table 8. During operation when the calendar feed table 8 is traveling forward to feed a calendar by the fingers 12, the lug 244 strikes the ball socket 16 on the end 238 of the guide bars 17 and carries the guide bars forward toward and against a winding rod 63 so that the calendar, by means of its metal bound edge may be positively guided into the shaft 74 in said guide bar. The end 238 of the guide bars is arrested by means of the ball 241 (full line position Fig. 27), but the continued feed of the table 8 and fingers 12 forces the lug 244 past the ball socket 16 until the guide bars 15 strike the stops 246. Upon return movement of the table 8 the lug 244 carries the guide bars back to the dotted line position of Fig. 27, the guide bars 17 coming to rest between the lugs 244 and 245.

*Operation*

The machine operates as follows assuming a manual feed of the calendars to the position where they are successively pushed into the rolling means by mechanically timed elements.

The operator of the machine first sets the winding reel 60 in position so that one of the winding rods 63 will be directly opposite the calendar feed guides by rotating the hand wheel 184. A calendar 6 is then manually pushed in the direction of the arrow, Fig. 3, under the plate 47 and just far enough so that the metal binding of the calendar is passed beyond the guide fingers 18. The motor is then started, which will carry out the various cycles of operation in timed relationship, dependent upon the operation of the cams, and for which the cams have been given the proper configuration.

The feed table 8 together with the pusher fingers 12 as well as the guide bars 17, are moved forward by the cam 207, elements 208, 171 and 10 so that the guide bars 17 will be adjacent the slot 74 of the winding rod 63 whereby the bars 17 will guide the calendar 6, which is pushed forward by the fingers 14 gripping the metal binding, into the slot 74 so that the latter will grip the metal binding 13 of the calendar. The cam 210 and elements 211, 171 and 10 now pushes the table 8 and the bars 17 back to its original position at the same time that the toothed rack 118, by lever 195 and arm 194, starts its upward movement by the cam 193 which will set the gear 112 in rotation to rotate the winding rods 63. The calendar is thus wound to an extent shown in Fig. 15 and before the final winding a sheet of wrapping paper 20 is fed into the partly rolled calendar, the winding reel 60 still remaining stationary.

The sheet of wrapping paper 20 has been previously fed onto the plate 47 by the apparatus shown in Fig. 1, together with the feed belt 54 driven by the cable 72 and pulley 185 from the cam shaft 170. The sheet of wrapping paper 20 is cut from the web 22 but is provided with strips of adhesive 25 and a tearing string 35 and is printed, if desired, before it is cut into its proper length by the knife 34. The cam 56 through the intermediate members, Fig. 24, that is elements 57, 59, 64, 67, 69 and 68, moves the pin 70 against the edge of the paper sheet 20 through the slots 71 and positively feeds it into the partly rolled calendar as shown in Fig. 15, at the same time that the table 47 has been tilted downwardly or is permitted to drop down, by the cam 213, arm 214, shaft 217 and arm 218 and after the table 8 and guide bars 17 have moved back out of the way by cam 210, arm 211, shaft 171 and links 10. A final winding and sealing of the wrapping paper now takes place at the same time that the cam 196, arm 197, shaft 198, arm 199 and lever 110, unlocks the winding reel to permit its rotation counter-clockwise, Fig. 3, while the gear 112 rotates clockwise, bringing the completely rolled and wrapped calendar down to the point 95′, Fig. 3, where the reel stops so that the immediately following winding rod may repeat the steps of receiving a calendar and its sheet of wrapping paper. At the point 95 or station, the adhesive on the wrapping paper is given a chance to dry somewhat and it will be noted that the pair of springs 89 for each winding rod will force the roller 82 against the paper and calendar to tightly roll the calendar and effectively seal the wraping paper and the rod 83, by means of the collars 84, is for the purpose of smoothing out the paper and preventing wrinkles forming in the wrapping paper during the rolling thereof. The winding reel, after the winding rod adjacent the feed tables 8 and 47 have received a calendar and wrapping paper sheet, is then given another and repeated ⅛ turn to bring the winding rod and the wrapped and rolled calendar to the point or station 95.

At the point 95 the extractor mechanism comes into operation as follows:

As the rolling rod 63 approaches the point 95 where the rod is to be extracted and the rolled and wrapped calendar is to be released, the head member 79 of the respective rolling rod enters or slides into the jaws 98, Fig. 20, the winding reel comes to rest and is locked against rotation by the members 110, 105 and 108, and the gear 112 also ceases its rotation to permit the reception of a new calendar and wrapping paper in the winding rod which has arrived at the feed tables, and to permit the rolled and wrapped calendar at 95′ to undergo a preliminary drying period. The cam 167 then adjusts the valve 153, Fig. 23, to permit compressed air to flow through hose 149 into the left hand end of cylinder 138 and to exhaust the air from the other end of the cylinder through hose 150, Figs. 17 and 18, to thereby move the piston 140 and ejector 134 to the right, Fig. 23, to thereby pull the rolling rod 63 out of the rolled and wrapped calendar 97, which latter then drops into the receptacle 235. The valve 153 is then again adjusted by cam 167 to return the piston and rolling rod back into the reel while at the same time a new calendar has been fed into the winding rod opposite the feed tables to repeat the cycles of operation.

In the following, a summarized and brief mode of operation relative to the various cycles of the winding reel will be explained, assuming the machine is started without any calendars in the reel.

In the position of Fig. 3, with the gear 112 and the winding reel 60 locked against rotation, a calendar is fed into the slot of the winding rod at 95″, by means of the metal binding, and the gear 112 is then unlocked and rotated clockwise with the reel still stationary. This will rotate all the winding rods and when the calendar at 95″ is wound to the extent as shown in Fig. 15, the wrapping paper is inserted. The winding reel is now unlocked and is rotated counterclockwise a ⅙ revolution at the same time that the gear is still rotating and continues to rotate clockwise until the rolled and wrapped calendar reaches the station 95′ when both the gear and winding reel are again locked. The wrapping paper of the rolled calendar at 95′ now undergoes a momentary drying while a new calendar is fed into the immediately following rod at 95″ thereupon following again an unlocking of the gear and a rotation thereof clockwise to rotate all the rods. When the calendar at 95″ is rotated to roll up to the extent of Fig. 15, the wrapping paper is fed in, the reel is unlocked and rotated, counter to the gear, another ⅙ revolution. The rolled, wrapped, posted and dried calendar now reaches the station 95 where it is released by pulling out its winding rod, the gear and winding reel having been again locked and the immediately following rolled and wrapped calendar reaches its drying station 95′. At 95″ the winding rod receives a new calendar and when the release of the rolled and wrapped calendar and the return of the winding rod has been completed at 95, the gear is unlocked and again started its rotation, to repeat the various cycles. It will be noted that during release of a rolled and wrapped calendar at 95 and a feed of a calendar at 95″, all the winding rods are stationary both as to rotary as well as circumferential motion. Also, it will be noted that the winding rods after leaving the station 95 proceed empty a ½ revolution of the winding reel before receiving a new calendar to be rolled and wrapped. Thus it would be within the scope of this invention to duplicate the calendar feed means, the wrapping paper feed means, the extractor mechanism and such other operating mechanism on the other side of the winding reel to make it possible to feed calendars at the station immediately preceding the station 95 to carry out the various cycles in connection with the three winding rods which are empty for the ½ revolution.

From the foregoing it is apparent that the winding reel as well as the gear are alternately locked and rotated during the various cycles and the machine is capable of wrapping as many calendars as it is practically possible to successively feed the calendars manually into the winding reel.

Obviously, the present invention is not restricted to the particular embodiment thereof herein shown and described. Moreover, it is not indispensable that all the features of the invention be used conjointly, since they may be employed advantageously in various combinations and subcombinations.

I claim as my invention:

1. In a machine for rolling and wrapping a plurality of superimposed sheets bound together at one end, means including a rolling rod on which the bound sheets are wound and wrapped; means engaging the binding of the sheets to positively feed the bound sheets into the winding and wrapping means; means for feeding sections of wrapper paper and for forcing one wrapper section into the partly wound sheets; and means for removing said rolling rod to permit the rolled and wrapped sheets to be released from the machine.

2. A machine for rolling and wrapping metal bound calendars and the like, comprising a winding rod; means engaging the binding of the calendar to feed the calendar into the winding rod; means for rotating the rod to wind the calendar therein into the winding rod; means for rotating the rod to wind the calendar thereon into a roll; means for preparing sections of wrapping paper; means for feeding a section of wrapping paper into a partially rolled calendar to be rolled around the calendar roll by the rotation of the rod; and means for axially pulling the winding rod from the rolled and wrapped calendar to permit the latter to be released from the machine.

3. A machine for rolling and wrapping metal bound calendars and the like, comprising a winding rod; means engaging the binding of the calendar to feed the calendar into the winding rod; means for rotating the rod to wind the calendar thereon into a roll; means for preparing sections of wrapping paper including means for applying a strip of adhesive adjacent one edge thereof and a tearing string parallel to said adhesive strip; means for feeding a wrapping paper section into a partially rolled calendar with the edge of the paper section projected into the partial roll which is opposite the adhesive strip and tearing string, the wrapping paper section being rolled by the winding rod and secured around the calendar roll by the adhesive strip; and means for axially pulling the winding rod from the rolled and wrapped calendar to permit the latter to be released from the machine.

4. A machine for rolling and wrapping metal bound calendars and the like according to claim 3, in which means are provided cooperating with the winding rod to guide the rolling operation and to cause a pressure on the calendar as it is being wound.

5. A machine for rolling and wrapping calendars and the like, comprising a winding reel having a plurality of winding rods rotatably mounted in the winding reel; means for successively feeding the calendars into successive winding rods; means for feeding a section of wrapping paper to and into each calendar on its winding rod; means for rotating the winding rods to roll the calendars and wrapping paper; means for rotating the winding reel to move the rolled and wrapped calendar to a point where the latter is to be released; and common releasing means for successively withdrawing the winding rods from the rolled and wrapped calendars.

6. A machine for rolling and wrapping calendars and the like, comprising a winding reel having a plurality of winding rods rotatably mounted therein; means for successively feeding the calendars into successive winding rods; means for feeding a section of wrapping paper to each calendar on its winding rod; means for rotating the winding rods to roll the calendars and wrapping paper into a tight roll; means for rotating the winding reel to move the rolled and wrapped calendar to a point where the latter is to be released; and common means for pulling successive rolling rods axially out of the rolled and wrapped calendar at the release point position of the winding reel.

7. A machine according to claim 6, in which pneumatic means are provided to actuate the pulling means for the rolling rods.

8. A machine according to claim 6, in which fluid operated means are provided to actuate the pulling means for the rolling rods; and in which means are provided to operate the calendar feed means, the section of wrapping paper feed means, the means for rotating the winding rods, the means for rotating the winding reel and the fluid operated means, in successive timed relativity.

9. In a machine for rolling and wrapping calendars on a winding rod, an extractor mechanism comprising an extractor bar having a pair of jaws into which the one end of the winding rod connects; an actuator in which the bar is slidably mounted and having a fork at one end thereof to also grip the said end of the winding rod; a spring on the extractor bar opposite the end on which the jaws are provided to urge the jaws out of the fork of the actuator; and means connected to the actuator to axially move the bar and actuator together and pull a winding rod out of a rolled and wrapped calendar to release the latter and to axially move the bar, actuator and winding rod back to their original positions with the spring compressed to force the jaws of the bar out of the fork of the actuator.

10. In a machine for rolling and wrapping calendars, a rolling means comprising a winding rod having a longitudinally directed slot in the peripheral surface thereof which grips an edge of the calendar to wind the calendar on the rod; a pressure rod arranged parallel to the winding rod and rotatably mounted to press against the calendar during the winding operation; a counter pressure rod rotatably mounted and arranged parallel to the winding rod to smooth out the calendar and wrapping paper during rolling; and means for constantly urging the pressure rods toward and against the winding rod.

11. In a machine for rolling and wrapping calendars, a winding reel comprising a shaft; a pair of frame discs mounted in spaced relation on the shaft to rotate therewith; a plurality of winding rods rotatably and slidably mounted in a circumferentially spaced relationship in the frame discs; a gear mounted on one end of each winding rod; and a gear mounted on the shaft to rotate the winding rods.

12. In a machine for rolling and wrapping calendars, a winding reel comprising a shaft; a pair of frame discs mounted in spaced relation on the shaft to rotate therewith; a plurality of winding rods rotatably and slidably mounted in a circumferentially spaced relationship in the frame discs; a gear mounted on one end of each winding rod; a gear in mesh with the gears on the winding rods to rotate the latter and being rotatably mounted on the shaft; a pair of pressure rods for each winding rod; a lever for each end of a pressure rod rotatably mounted thereon at one end of the lever, said lever being pivotally mounted at the other end on its respective frame disc; and means for forcing each pair of pressure rods toward its winding rod and including means to move the pressure rods away from its winding rod.

13. A winding reel according to claim 12, in which means are provided including a cam for each pair of cooperating levers to force the pressure rods connected to said levers apart upon releasing a rolled and wrapped calendar.

14. In a machine for rolling and wrapping calendars, a feeding device for successively feeding the calendars into a winding means comprising a feed table; means for slidably mounting said table to reciprocate in the machine; means for moving said table back and forth; and means secured to the feed edge of the table to positively grip one edge of the calendar and feed it into the winding means upon the forward movement of the table.

15. In a machine for rolling and wrapping metal bound calendars, a feeding device for successively feeding the calendars into a winding means comprising a feed table slidably mounted in the machine; means for reciprocating the said table; and a plurality of pusher fingers secured at one end to the feed edge of the table, each finger at the other end having a forked end which is adapted to grip the metal binding of the calendar to positively feed the calendar into the winding means upon the forward movement of the table.

16. In a machine for rolling and wrapping metal bound calendars, a feeding device for successively feeding the calendars and the wrapping paper into a winding means; comprising a feed table slidably mounted in the machine; means for reciprocating the feed table to feed a calendar into the winding means by the metal binding; a feeding plate hinged to the machine over the feed table and adapted to feed sections of wrapping paper; means for slightly rotating the feeding plate to bring the feeding table into a position to feed the wrapping paper section into a partially rolled calendar after the feed table has completed a feed cycle for a calendar; and means for positively inserting the wrapping paper section from the feeding plate into the partially rolled calendar.

17. A feeding device according to claim 16, in which means are provided in the feeding plate to successively receive the wrapping paper section from a direction at right angles to the feed of the wrapping paper sections into the partially rolled calendars.

18. In a machine for rolling and wrapping calendars and the like, a guide device for guiding one edge of the calendar into the winding means of the machine, comprising a pair of floating guide bars in spaced relationship, the space between the bars comprising such distance to accommodate the thickness of the sheets of the calendar; and means to reciprocate the guide bars to move the latter adjacent the winding means to feed a calendar and to move the bars back from the winding means to feed a section of wrapping paper.

19. A guide device according to claim 18, in which the guide bars are integrally connected at their ends and are slightly wedge shaped with the smaller thickness along the lead in edges for the calendars, and in which guide fingers are secured on the level in edges of the bars to facilitate a correct insertion of the calendar edge between the bars.

20. In a machine for rolling and wrapping calendars and the like, a fluid-operated system for pulling a winding rod out of a rolled and wrapped calendar and the winding reel and to return it back into the reel, comprising a piston; a piston rod and cylinder; means for releasably connecting the piston rod to the winding rod; a valve in pipe communication with both ends of the cylinder and with a source of fluid under pressure; and means for actuating the valve to intermittently admit the pressure fluid first in one end of the cylinder and then in the other end to extract and retract the winding rod into and out of the reel.

21. In a machine for rolling and wrapping calendars, a drive mechanism for successively feeding, rolling and releasing the calendars and wrapping paper sections in timed relationship, comprising a main drive shaft; a cam shaft; a rocker arm shaft; an auxiliary shaft; means for rotating the cam shaft from the drive shaft; means mounted on the cam shaft for rotating the rocker and auxiliary shafts back and forth; and means on the cam, rocker arm and auxiliary shafts for operating the successive preparation of wrapping paper sections, the successive feeding of the calendars and wrapping sections, the rolling and winding of the calendar and paper sections, and releasing the wrapped calendars, all in timed relationship.

22. In a machine for rolling and wrapping calendars, a feeding device for successively feeding the calendars and wrapping paper into a winding means comprising a feed table; means for slidably mounting said table to reciprocate in the machine; means for moving said table back and forth; means secured to the feed edge of the table to positively grip one edge of the calendar and feed it into the winding means upon the forward movement of the table; and means for feeding wrapping paper into a partially wound calendar.

23. In a machine for rolling and wrapping calendars, a feeding device for successively feeding the calendars and wrapping paper into a winding means comprising a feed table; means for slidably mounting said table to reciprocate in the machine; means for moving said table back and forth; means secured to the feed edge of the table to positively grip one edge of the calendar and feed it into the winding means upon the forward movement of the table; a feeding plate hinged to the machine above the feed table to feed wrapping paper into a partially wound calendar; and means for tilting said feeding plate upon feeding the wrapping paper into the partially wound calendar.

24. In a machine for rolling and wrapping calendars, a feeding device for successively feeding the calendars and wrapping paper into a winding means comprising a feed table; means for slidably mounting said table to reciprocate in the machine; means for moving said table back and forth; means secured to the feed edge of the table to positively grip one edge of the calendar and feed it into the winding means upon the forward movement of the table; a feeding plate hinged to the machine above the feed table upon which the wrapping paper is received; means for tilting said feeding plate upon feeding the wrapping paper into a partially wound calendar; and means for positively feeding the wrapping paper from the feeding plate.

25. In a machine for rolling and wrapping calendars, a rolling and releasing mechanism comprising a reel having a plurality of winding rods circumferentially arranged around the reel and each of which is provided with means to contact an edge of the calendars upon the start of the rolling thereof on the rod, and a device arranged adjacent a circumferential point of the reel to reciprocate the winding rods as they successively reach said point to axially withdraw each rod from the reel and its rolled calendar and to return the rod into the reel after the rolled calendar drops from the reel.

26. A rolling and releasing mechanism according to claim 25, in which each winding rod is provided with a head member on one end thereof and the device is provided with an extractor bar having jaws thereon into which the head member moves circumferentially for the extraction operation.

27. In a machine for rolling and wrapping bound-edged calendars and the like, a rolling means comprising a winding rod having a longitudinally directed groove in the peripheral surface thereof having a bottom acting as a limit stop for the calendar, said groove engaging a bound edge of the calendar to wind the calendar on the rod from the inside outwardly; and a head member on one end of the rod by means of which the rod is pulled axially out of the rolled and wrapped calendar.

28. In a machine for rolling and wrapping bound-edged calendars and the like, winding and releasing devices for rolling and releasing the calendars, comprising a winding rod having a longitudinally directed groove therein to engage the bound edge of the calendar and being rotatably mounted and axially movable, said groove having a bottom acting as a limit stop for the calendar when the latter is inserted; means for rotating said rod to wind and wrap a calendar thereon from the bound edge outwardly; and means for pulling the rod axially out of a rolled and wrapped calendar to release the latter.

FRANK G. COOK.